Feb. 13, 1945.   C. W. HALL   2,369,566
ROTARY VALVE
Filed Oct. 4, 1943   2 Sheets-Sheet 2

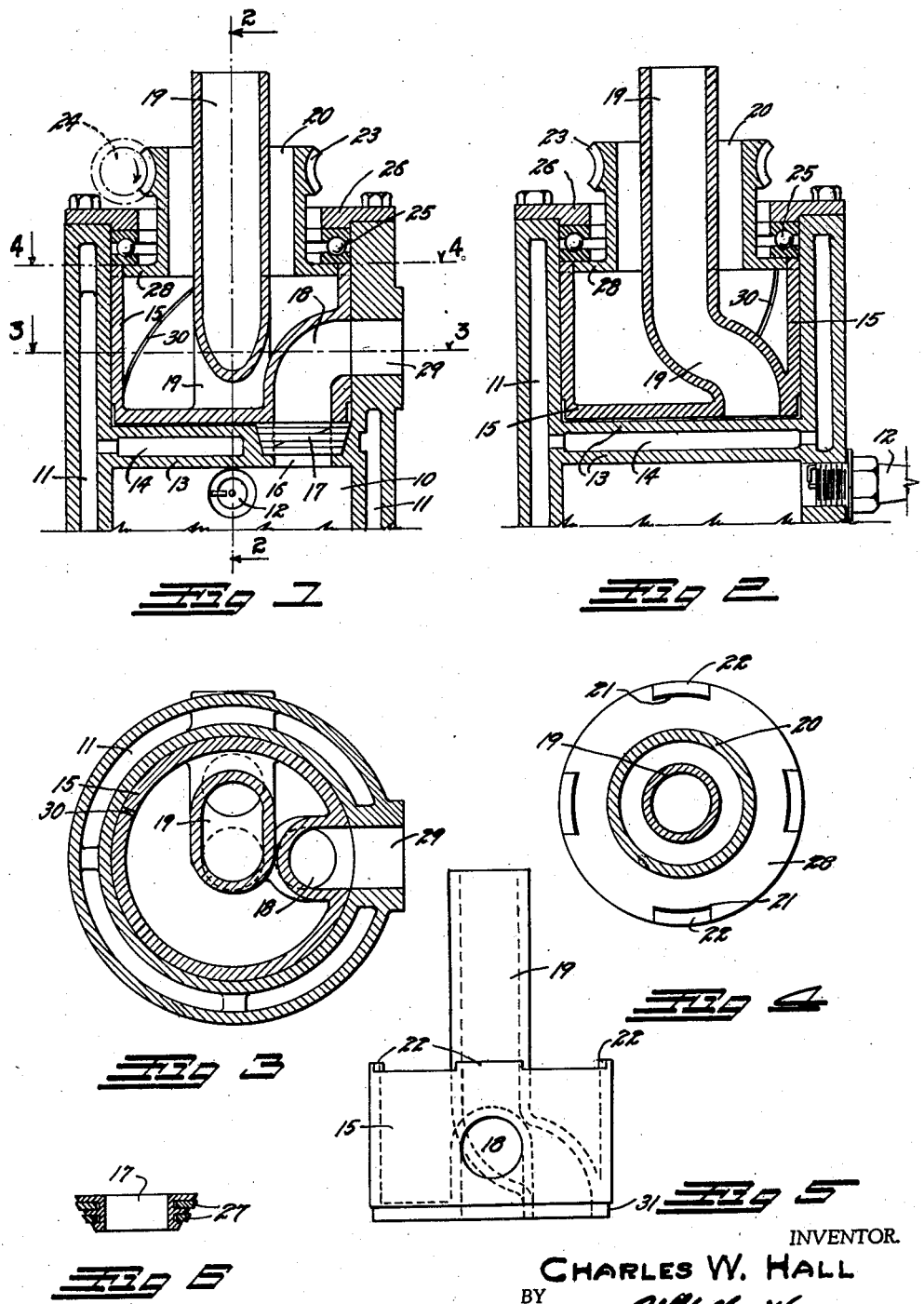

INVENTOR.
CHARLES W. HALL
BY
ATTORNEY.

Patented Feb. 13, 1945

2,369,566

UNITED STATES PATENT OFFICE 2,369,566

ROTARY VALVE

Charles W. Hall, Denver, Colo., assignor to Malcom S. Losey, Denver, Colo.

Application October 4, 1943, Serial No. 504,972

11 Claims. (Cl. 123—190)

This invention relates to a rotary valve for internal combustion engines, and has for its principal object the provision of a valve so constructed that differential expansion due to uneven heating and cooling will not distort the valve nor effect the sealing thereof. In the usual rotary valve, the exhaust passage in the valve is fixedly secured to the valve at both of its extremities. This passage, due to its high heat, is naturally subjected to greater expansion than the intake passage in the valve. This results in a warpage or twisting of the valve which interferes with the perfect sealing thereof. This improved valve is so designed that expansion or contraction of the exhaust passage will have no distorting affect on the valve itself.

Another object of the invention is to provide a valve of this character in which the intake passage will be subjected to a minimum of heating so that the incoming gases will not be expanded before they enter the cylinder where their expansion can be profitably utilized.

Other objects of the invention are: to provide a valve of this character in which the entire interior will be open to the atmosphere for air cooling effect; to provide a highly efficient sealing ring which will tend to expand both laterally and axially to efficiently seal the valve to the cylinder port; to provide an effective wearing surface in the valve itself; and to provide a highly efficient lubrication means for the valve.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a fragmentary cross section through the head of a typical internal combustion engine cylinder, illustrating the improved valve in place thereon;

Fig. 2 is a similar cross section, taken on the line 2—2, Fig. 1;

Fig. 3 is a horizontal section through the valve, taken on the line 3—3, Fig. 1;

Fig. 4 is a horizontal section of the valve only, taken on the line 4—4, Fig. 1;

Fig. 5 is a side view of the improved valve;

Fig. 6 is a detail cross-section through the sealing ring employed with the valve;

Figure 7:
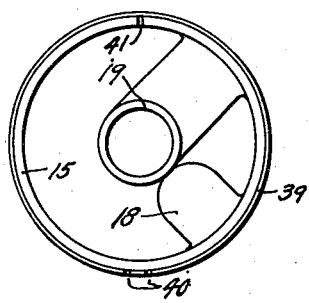
Fig. 7 is a plan view of an alternate form of valve having a hardened wearing surface.

In the drawings an internal combustion engine cylinder is indicated at 10, with its water jacket at 11, and spark plug at 12. A valve head 13 closes the upper extremity of the cylinder 10, and this head may be provided with suitable water jacket space 14 if desired. Above the head 13 is a cylindrical valve chamber containing a cup-like rotary valve 15. A cylinder port 16 communicates through the head 13 between the cylinder and the valve chamber and to one side of the axis of the latter. This port contains an expansible sealing ring 17 which constantly urges itself upwardly against the bottom of the valve 15 to support the latter.

A relatively short curved intake tube 18 communicates through the cylindrical side wall of the valve 15 to register with an intake port 29 and through the bottom thereof to one side of the axis so as to register with the cylinder port 16. An exhaust tube 19 also communicates through the bottom of the valve at a point which can also be brought to register with the cylinder port 16. The tube 19 extends radially inward to the axis of the valve, thence outwardly in axial relation therewith. The top of the valve is open.

The valve is rotated by means of a tubular hub member 20, provided at its inner extremity with an annular flange 28 which rests upon the open outer edge of the valve 15. The flange 28 is notched, as shown at 21, at a plurality of points to receive tenons 22 extending upwardly from the valve wall. Thus it can be seen that if the hub member 20 is rotated, it will rotate the valve 15 as a unit therewith.

Rotation can be imparted to the hub member in any desired manner. As illustrated, the hub member is provided at its outer extremity with worm gear teeth 23 for engagement with a suitable driving worm such as indicated in broken line at 24. The inner diameter of the hub member is relatively larger than the diameter of the exhaust tube 19 so that there will be no contact therebetween for the transmission of damaging temperature and so that air may freely circulate through the interior of the valve. The upthrust on the valve, imparted by the expanding ring 17, is absorbed by a suitable thrust bearing 25 acting against an annular head plate 26.

The operation of a rotary valve engine is so well understood that it need not be described in detail here. It is sufficient to say that rotation of the valve 15 brings the intake tube 18 and the exhaust tube 19 alternately into communication with the cylinder 10 to coincide with the intake and exhaust cycles of the latter.

The sealing ring may be of any desired construction which will impart both a diametric and an axial thrust so that it will seal itself both to the walls of the port 16 and to the bottom of the valve 15. Such a ring is illustrated in detail in Fig. 6, in which the ring 17 proper has an inverted conical shape and is designated to rest in a conical ring seat. One or more laterally expanding rings 27 are carried in ring grooves in the ring 17 and tend to expand against the inclined conical wall of the ring seat so as to tend to force the entire assembly out of the conical seat and snugly against the bottom of the rotary valve.

The bottom of the cylindrical surface of the valve is cut back as shown at 31 to accommodate the expansion of the bottom of the valve. The cylindrical wall of the valve is split as indicated at 30 to allow it to be contracted when forced into the chamber to insure a tight wall fit.

If it is desired to obtain a more uniform and greater pressure on the bottom of the valve in order to support the weight thereof, a second thrust ring 32 may be positioned in an annular conical seat in the bottom of the valve chamber diametrically opposite to the first sealing ring 17. This second ring may be similar in construction to the ring 17 and it not only serves as a thrust ring but also acts as an oil distributor. Lubricating oil is conducted through an oil hole 33 to the center of the ring 32, and since the ring is rotated by its contact with the valve it will continuously and uniformly distribute the oil over the lower surface of the valve.

Figure 10:
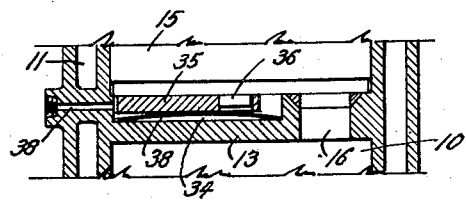
Fig 10 is a similar section illustrating a lubricating device applied to the improved valve.
Figure 11:
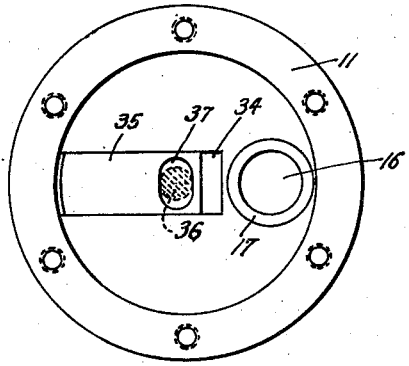
Fig. 11 is a plan view of a typical valve chamber with the head and valve removed showing the lubricating device of Fig. 10 in place.

An alternate method of lubricating the valve is indicated in Figs. 10 and 11. In this form a radially extending slide socket 34 is formed in the bottom of the valve chamber. A sliding member 35 is mounted in this socket so that it may reciprocate diametrically therein. The reciprocation is imparted by means of an eccentric stud 36 formed on the bottom of the rotary valve. This stud rides in a receiving slot 37 in the member 35 so that during each rotation of the valve the member 35 will be reciprocated one complete cycle. The constant reciprocation not only serves to uniformly distribute the oil, but also prevents the formation of circular wear grooves or scratches in the bottom of the valve. The slide member 35 is formed of softer metal than the valve so as not to wear the latter. A spring member 38 is positioned in the groove 34 below the slide member 35 to constantly force it against the valve to assist in supporting the latter. Oil is supplied to the slide socket 34 through any suitable oil channel 38.

Figure 8:
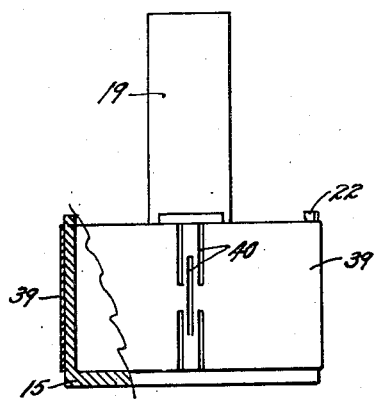
Fig. 8 is a side view of the valve of Fig. 7, illustrating it partially broken away to show the sectional construction thereof.
Figure 9:
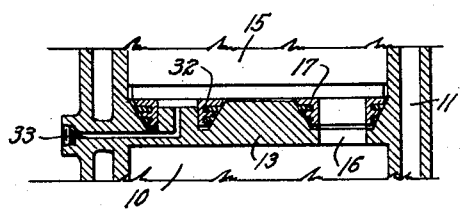
Fig. 9 is a fragmentary section through the bottom of the valve chamber illustrating the use of two supporting rings.

In Figs. 7 and 8 an alternate method of constructing the valve itself is illustrated. In this form the valve is formed of one metal such as iron or aluminum and is surrounded by a wear band 39 of steel or other harder wear resisting metal. The wear band is shrunk onto the valve so as to tightly grip the latter, and the band is provided with a series of overlapping expansion slots 40, which allow it to expand and contract under the influence of temperature and to accommodate the expansion and contraction of the valve itself. The latter is split as shown at 41 to also accommodate expansion.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A rotary valve for internal combustion engines comprising a cup-shaped valve member having a closed bottom and cylindrical side; an intake passage communicating eccentrically through said bottom and through the cylindrical side of said valve; an exhaust tube also communicating eccentrically through said bottom, thence extending to the axis of said valve, thence projecting axially through and beyond the open top thereof; and a hub member surrounding said exhaust tube for rotating said valve.

2. A rotary valve for internal combustion engines comprising a cup-shaped valve member having a closed bottom and cylindrical side; an intake passage communicating eccentrically through said bottom and through the cylindrical side of said valve; an exhaust tube also communicating eccentrically through said bottom, thence extending to the axis of said valve, thence projecting axially through and beyond the open top thereof; a hub member concentrically surrounding the exhaust tube; and means for communicating the rotation of said hub member to the cylindrical wall of said valve.

3. A rotary valve for internal combustion engines comprising a cup-shaped valve member having a closed bottom and cylindrical side; an intake passage communicating eccentrically through said bottom and through the cylindrical side of said valve; an exhaust tube also communicating eccentrically through said bottom, thence extending to the axis of said valve, thence projecting axially through and beyond the open top thereof, a hub member surrounding said exhaust tube; and means for communicating the rotation of said hub member to the cylindrical wall of said valve, said hub member extending concentrically about said exhaust passage in spaced relation thereto.

4. A rotary valve for internal combustion engines comprising a cup-shaped valve member having a closed bottom and cylindrical side; an intake passage communicating eccentrically through said bottom and through the cylindrical side of said valve; and an exhaust tube also communicating eccentrically through said bottom, thence extending to the axis of said valve, thence projecting axially through and beyond the open top thereof; a hub member surrounding said exhaust tube; and means projecting from the cylindrical wall of said valve into engagement with receiving means in said hub member to cause the two elements to rotate in unison.

5. A rotary valve for internal combustion engines comprising a cup-shaped valve member having a closed bottom and cylindrical side; an intake passage communicating eccentrically through said bottom and through the cylindrical side of said valve; an exhaust tube also communicating eccentrically through said bottom, thence extending to the axis of said valve, thence projecting axially through and beyond the open top thereof; a hub member concentrically surrounding said exhaust tube in spaced-relation therewith; and an annular flange formed on said hub member, said flange resting on the edge of the cylindrical wall of said valve.

6. A rotary valve for internal combustion engines comprising a cup-shaped valve member having a closed bottom and cylindrical side; an intake passage communicating eccentrically through said bottom and through the cylindrical side of said valve; an exhaust tube also communicating eccentrically through said bottom, thence extending to the axis of said valve, thence projecting axially through and beyond the open top thereof; a hub member concentrically surrounding said exhaust tube in spaced-relation therewith; an annular flange formed on said hub member, said flange resting on the edge of the cylindrical wall of said valve; means for communicating the rotative movement of said hub member to said valve; and means for rotating said hub member.

7. A rotary valve for an internal combustion engine cylinder comprising; a valve chamber positioned adjacent the head of said cylinder; an intake port in the side of said chamber; a cylinder port communicating between said chamber and said cylinder to one side of the axis to the former; a cup-shaped rotary valve resting in said chamber; an intake tube opening through the bottom of said rotary valve at a position to register with said cylinder port, the other extremity of said intake tube communicating through the cylindrical wall of said valve at a point to register with said intake port; an exhaust tube communicating through the bottom of said valve at a point to register with said cylinder port, the other extremity of said exhaust tube extending axially outward from the open top of said valve; a hub member concentrically surrounding said exhaust tube and resting on the edge of the cylindrical wall of said valve; means for rotating said hub member; and means for communicating the rotation of said hub member to said valve.

8. The combination with a rotary valve of a valve chamber provided with a receiving groove in its bottom a slide member positioned in said groove; and means for reciprocating said slide member in consequence of the rotation of said valve to distribute lubrication over the bottom thereof.

9. The combination with a rotary valve of a valve chamber provided with a receiving groove in its bottom a slide member positioned in said groove; means for reciprocating said slide member in consequence of the rotation of said valve to distribute lubrication over the bottom thereof; and resilient means urging said slide member against said valve to support the latter.

10. The combination with a rotary valve of a valve chamber provided with a receiving groove in its bottom a slide member positioned in said groove; and an eccentric stud projecting from the bottom of said valve into contact with said slide member to reciprocate the latter.

11. A sealing ring for rotary valves comprising: an annular conical ring; a conical ring socket receiving said ring; and radially expansible rings carried in ring slots in the first ring said expansible rings engaging the inclined walls of said socket to tend to create movement of said ring in an axial direction so as to urge the ring assembly from said socket.

CHARLES W. HALL.